United States Patent
Fisher et al.

(10) Patent No.: US 11,292,591 B2
(45) Date of Patent: *Apr. 5, 2022

(54) UNMANNED AERIAL VEHICLE AND METHOD OF OPERATION

(71) Applicant: AEROVIRONMENT, INC., Arlington, VA (US)

(72) Inventors: Christopher E. Fisher, Simi Valley, CA (US); John P. Zwaan, Simi Valley, CA (US); Marc L. Schmalzel, Simi Valley, CA (US); Steven Chambers, Simi Valley, CA (US); Justin McAllister, Monrovia, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 909 days.

This patent is subject to a terminal disclaimer.

(21) Appl. No.: 13/656,587

(22) Filed: Oct. 19, 2012

(65) Prior Publication Data

US 2013/0099048 A1 Apr. 25, 2013

Related U.S. Application Data

(63) Continuation of application No. PCT/US2011/033680, filed on Apr. 22, 2011.
(Continued)

(51) Int. Cl.
*B64C 29/00* (2006.01)
*B64C 39/02* (2006.01)

(52) U.S. Cl.
CPC .......... *B64C 29/00* (2013.01); *B64C 29/0033* (2013.01); *B64C 39/024* (2013.01);
(Continued)

(58) Field of Classification Search
CPC .............. B64C 29/0033; B64C 39/024; B64C 2201/042; B64C 2201/088;
(Continued)

(56) References Cited

U.S. PATENT DOCUMENTS 2,927,747 A * 3/1960 Bennie ........................ 244/17.17
3,075,731 A * 1/1963 Bennett et al. ............... 244/115
(Continued)

FOREIGN PATENT DOCUMENTS

BE     1 000 007 A7   11/1987
GB       904157        8/1962
(Continued)

OTHER PUBLICATIONS

International Search Report for Serial No. PCT/US11/33680 dated Sep. 16, 2011.
(Continued)

*Primary Examiner* — Christopher D Hutchens
(74) *Attorney, Agent, or Firm* — Concept IP LLP; Pejman Yedidsion; Eric Aagaard

(57) ABSTRACT

A method of unmanned aerial vehicle (UAV) flight includes providing horizontal thrust in-line with the direction of forward flight of the UAV (110) using at least one electric motor (120), providing primary vertical lift for the UAV (110) during the forward flight using a fixed and non-rotating wing (125), repositioning the at least one electric motor (120') to provide vertical thrust during transition of the UAV (110) to vertical flight (A) for descent (E), landing the UAV (110) on a surface (270) using a vertical approach after the motor repositioning, and deploying an anchor (150) to secure the UAV (110) to a surface (270).

15 Claims, 18 Drawing Sheets

Related U.S. Application Data

(60) Provisional application No. 61/327,089, filed on Apr. 22, 2010.

(52) U.S. Cl.
CPC .. *B64C 2201/042* (2013.01); *B64C 2201/104* (2013.01); *B64C 2201/108* (2013.01); *B64C 2201/127* (2013.01); *B64C 2201/165* (2013.01)

(58) Field of Classification Search
CPC ........ B64C 2201/123; B64C 2201/127; B64C 2201/12; B64C 29/00; B64D 27/24; B64D 47/08; B64D 2201/00; B64F 1/12; B64F 1/125; B64F 1/16; H04W 52/06; H02J 50/80; G06F 1/3206; G06F 1/3246; H04N 5/232411
USPC ...................................................... 340/693.3
See application file for complete search history.

(56) References Cited

U.S. PATENT DOCUMENTS

| | | | | |
|---|---|---|---|---|
| 4,452,087 | A * | 6/1984 | D'Antonio | G01L 1/205 |
| | | | | 73/786 |
| 4,697,761 | A * | 10/1987 | Long | B64D 27/24 |
| | | | | 244/45 R |
| 4,917,329 | A | 4/1990 | Vollmerhausen | |
| 5,092,540 | A * | 3/1992 | Burgess et al. | 244/110 F |
| 5,289,994 | A * | 3/1994 | Del Campo Aguilera | 244/7 B |
| 5,467,813 | A * | 11/1995 | Vermaat | 165/11.2 |
| 5,560,568 | A * | 10/1996 | Schmittle | 244/48 |
| 5,575,438 | A * | 11/1996 | McGonigle | B64C 39/024 |
| | | | | 244/118.1 |
| 5,687,930 | A | 11/1997 | Wagner et al. | |
| 6,712,312 | B1 * | 3/2004 | Kucik | B64C 39/024 |
| | | | | 244/1 R |
| 7,133,704 | B2 * | 11/2006 | Twitchell, Jr. | G06K 7/10079 |
| | | | | 455/574 |
| 8,874,283 | B1 * | 10/2014 | Cavote | 701/2 |
| 8,936,212 | B1 * | 1/2015 | Fu et al. | 244/6 |
| 2003/0133573 | A1 * | 7/2003 | Himmel | G06F 1/28 |
| | | | | 380/258 |
| 2004/0256519 | A1 * | 12/2004 | Ellis et al. | 244/110 E |
| 2005/0096800 | A1 * | 5/2005 | Tanielian | B64C 39/024 |
| | | | | 701/2 |
| 2005/0176455 | A1 * | 8/2005 | Krishnan | H04W 52/08 |
| | | | | 455/522 |
| 2006/0231675 | A1 * | 10/2006 | Bostan | B64C 3/385 |
| | | | | 244/12.1 |
| 2006/0262646 | A1 | 11/2006 | Horak et al. | |
| 2006/0284002 | A1 * | 12/2006 | Stephens | B64C 15/00 |
| | | | | 244/12.4 |
| 2007/0158494 | A1 | 7/2007 | Burrage | |
| 2007/0215748 | A1 | 9/2007 | Robbins et al. | |
| 2009/0045295 | A1 | 2/2009 | Lundgren | |
| 2009/0159757 | A1 | 6/2009 | Yoeli | |
| 2009/0212157 | A1 | 8/2009 | Arlton et al. | |
| 2009/0212166 | A1 * | 8/2009 | Garreau | 244/7 R |
| 2009/0279881 | A1 * | 11/2009 | Geris | G03B 7/26 |
| | | | | 396/205 |
| 2010/0140415 | A1 * | 6/2010 | Goossen | 244/23 A |
| 2010/0228406 | A1 * | 9/2010 | Hamke | G05D 1/0038 |
| | | | | 701/3 |
| 2011/0042507 | A1 | 2/2011 | Bevirt | |
| 2011/0042508 | A1 * | 2/2011 | Bevirt | B64C 15/00 |
| | | | | 244/12.4 |
| 2011/0071706 | A1 * | 3/2011 | Crumm | B64C 39/024 |
| | | | | 701/3 |
| 2011/0087903 | A1 * | 4/2011 | MacDougall | G06F 1/26 |
| | | | | 713/310 |
| 2012/0056040 | A1 * | 3/2012 | Brotherton-Ratcliffe et al. | |
| | | | | 244/23 A |
| 2012/0091284 | A1 * | 4/2012 | Goodarzi | 244/23 A |
| 2012/0298292 | A1 * | 11/2012 | Fisher et al. | 156/247 |
| 2014/0103158 | A1 * | 4/2014 | Berry | 244/2 |
| 2014/0291442 | A1 * | 10/2014 | Laks et al. | 244/115 |

FOREIGN PATENT DOCUMENTS

| | | |
|---|---|---|
| JP | 9-512765 | 12/1997 |
| WO | WO 95/30575 | 11/1995 |

OTHER PUBLICATIONS

Extended European Search Report for Serial No. 11772821.2 dated Apr. 8, 2014.

* cited by examiner

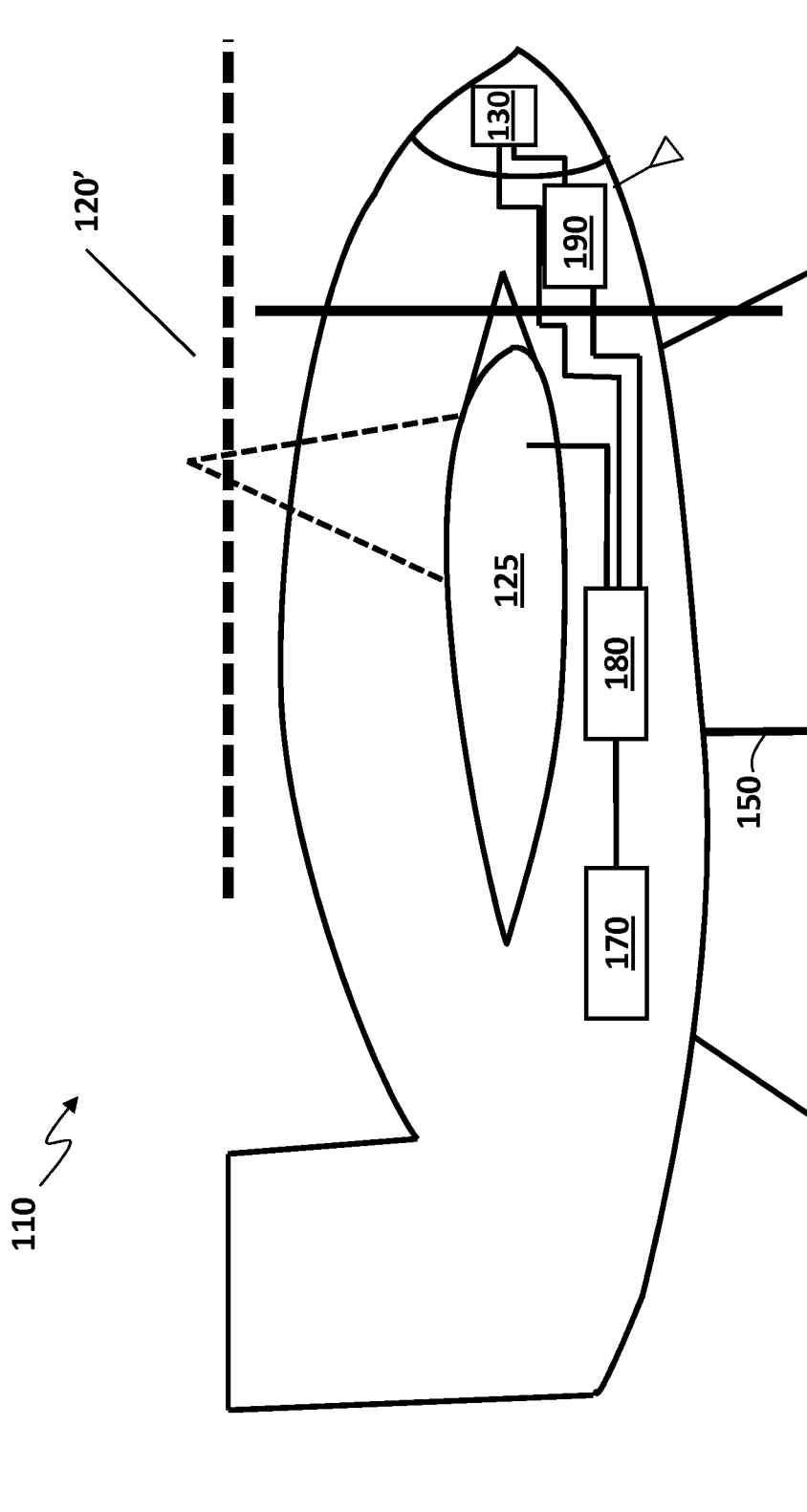

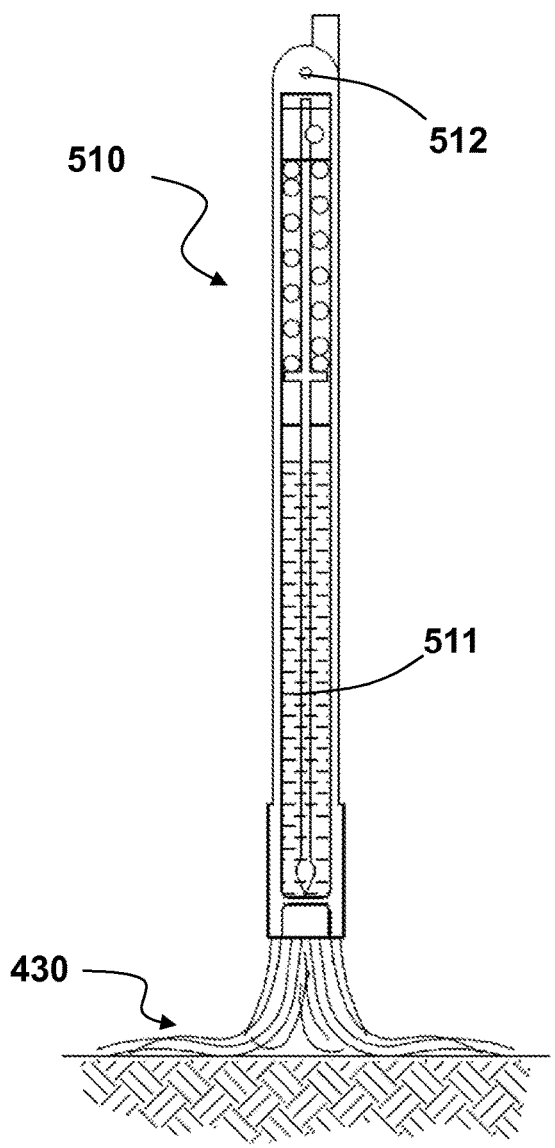
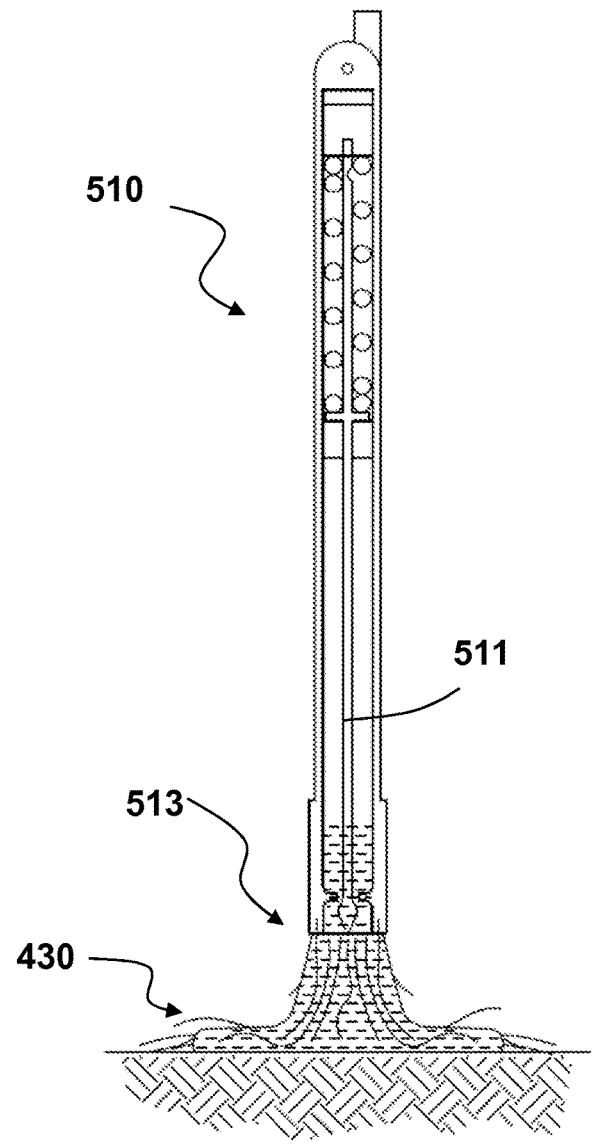
FIG. 5A  FIG. 5B

UNMANNED AERIAL VEHICLE AND METHOD OF OPERATION

CROSS-REFERENCE TO RELATED APPLICATIONS

This application is a continuation of International Application No. PCT/US2011/33680 filed Apr. 22, 2011, which claims priority to and benefit of Provisional Patent Application No. 61/327,089 filed Apr. 22, 2010 both of which are hereby incorporated by reference for all purposes.

TECHNICAL FIELD

The technical field relates to aerial vehicles, and more particularly to powered aerial vehicles that have vertical take-off and landing capabilities.

BACKGROUND ART

Unmanned aerial vehicles (UAVs) may be used to provide remote observation of a location of interest, such as monitoring forest fires, penetrating and analyzing volcanic plumes, monitoring of pipeline and other utility assets, finding those who are lost and in distress or monitoring other remote observation locations not immediately available to observers on the ground.

BRIEF DESCRIPTION OF THE DRAWINGS

Embodiments of the invention are illustrated by way of example and not limitation in the figures of the accompanying drawings, and in which:

FIG. 1C depicts one embodiment of a UAV system having a power distributor to control power distribution from a battery to propulsion motors, observation sensor and transmitter;

FIGS. 5A and 5B illustrate another assembly embodiment of an adhesive anchor;

SUMMARY

Figure 1A:
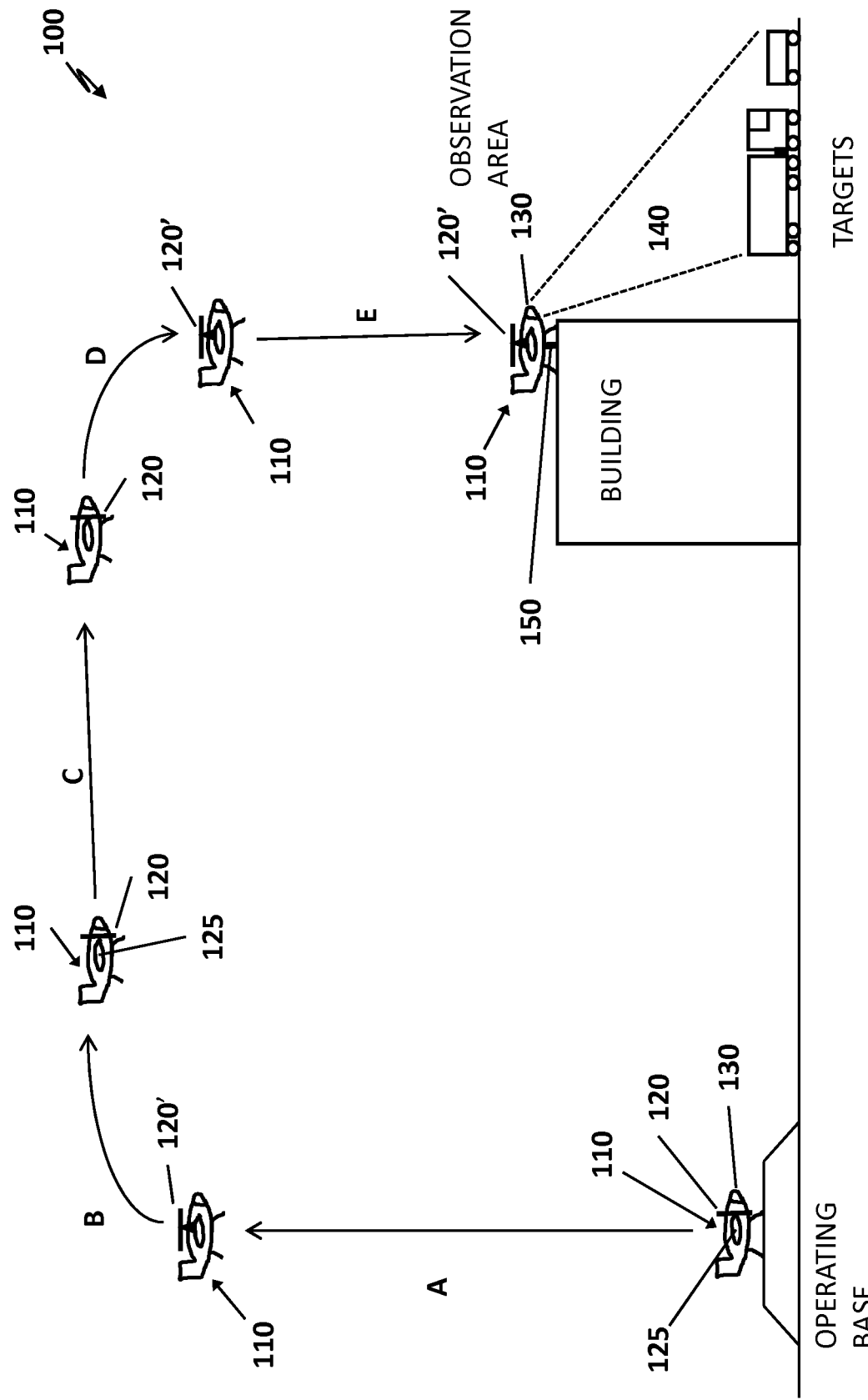
FIG. 1A depicts one embodiment of a flight-path of a UAV system for traveling from an operating base to an observation area, and includes a block diagram that illustrates preferred components of the UAV system.

Exemplary embodiments of an unmanned aerial vehicle (UAV) system are disclosed that enable transition of the UAV from an operating base to a remote observation site for either aerial monitoring or monitoring from a surface not immediately available to monitoring personnel. The UAV may then transition back to the operating base for recovery. In one embodiment of a method of operation for such an UAV system, the method includes providing horizontal thrust in-line with the direction of forward flight of the UAV using at least one electric motor, providing primary vertical lift for the UAV during the forward flight (i.e., horizontal flight) using a fixed and non-rotating wing, repositioning the at least one electric motor to provide vertical thrust to transition the UAV to vertical flight for descent, landing the UAV on a surface using a vertical approach after repositioning the at least one electric motor, and then deploying an anchor to secure the UAV to a landing surface.

An exemplary embodiment of a method for unmanned aerial vehicle flight includes providing horizontal thrust in-line with the direction of forward flight of the UAV using at least one electric motor; providing primary vertical lift for the UAV during the forward flight using a fixed and non-rotating wing; repositioning the at least one electric motor to provide vertical thrust during transition of the UAV to vertical flight for descent; landing the UAV on a surface using a vertical approach after the repositioning; deploying an anchor to secure the UAV to a surface; providing vertical thrust in-line with the direction of vertical flight of the UAV using the at least one electric motor for UAV ascent; and repositioning the at least one electric motor to provide horizontal thrust during transition of the UAV from ascent to horizontal flight. The anchor may be an adhesive anchor and so the method may include separating the adhesive anchor from the UAV to deploy the UAV from the surface; providing vertical thrust in-line with the direction of vertical flight of the UAV using the at least one electric motor for UAV ascent after separating; and repositioning the at least one electric motor to transition the UAV from ascent to horizontal flight after separating. The method may also comprise generating observation data while the UAV is landed; and periodically transmitting the observation data to a receiver external to the UAV while the UAV is landed. The method may also comprise reducing power to one of an observation sensor, the transmitter, and the at least one electric motor through a power distributor to reduce the UAV's overall power usage after the UAV has landed. The observation sensor may be an optical camera, an infrared camera, a microphone, a vibration sensor, a heat sensor, and/or a radiation sensor. The method may also comprise restoring power to all systems on the UAV necessary to deploy the UAV from the surface; separating the anchor from the UAV to deploy the UAV from the surface; providing vertical thrust in-line with the direction of vertical flight of the UAV using the at least one electric motor for UAV ascent; repositioning the at least one electric motor to transition the UAV to horizontal flight and reducing power to one of an observation sensor and said transmitter through said power distributor to reduce the UAV's overall power usage during UAV horizontal flight.

Exemplary embodiments of an unmanned aerial vehicle apparatus may comprise a fixed and non-rotating wing to provide primary lift for the UAV while in horizontal flight; at least one electric motor coupled to the wing to rotatably, e.g., via a propeller, and selectively direct thrust in horizontal and vertical directions, the at least one electric motor, e.g., via a propeller, providing primary lift for the UAV during vertical flight; means for securing the UAV to a surface, e.g., via a detachable adhesive deploying element; means for generating observation data, e.g., via one or more passive sensors; and means for transmitting the observation data, e.g., via an RF transmitter. For example, the means for generating observation data may be capable of periodically generating the observation data, and the means for generating observation data may comprise a camera. The means for securing the UAV to the surface may be an adhesive anchor to secure the UAV to a surface, and the anchor may be separable from the UAV. In one embodiment, the anchor comprises a liquid adhesive reservoir and a liquid adhesive infusible brush. Also, the at least one electric motor may be coupled to the wing to rotatably and selectively direct thrust in the horizontal direction in-line with the direction of forward flight. Also, the at least one electric motor may be coupled to the wing to rotatably and selectively direct thrust in the horizontal direction in-line with a chord line of the wing.

DETAILED DESCRIPTION

Figure 1B:
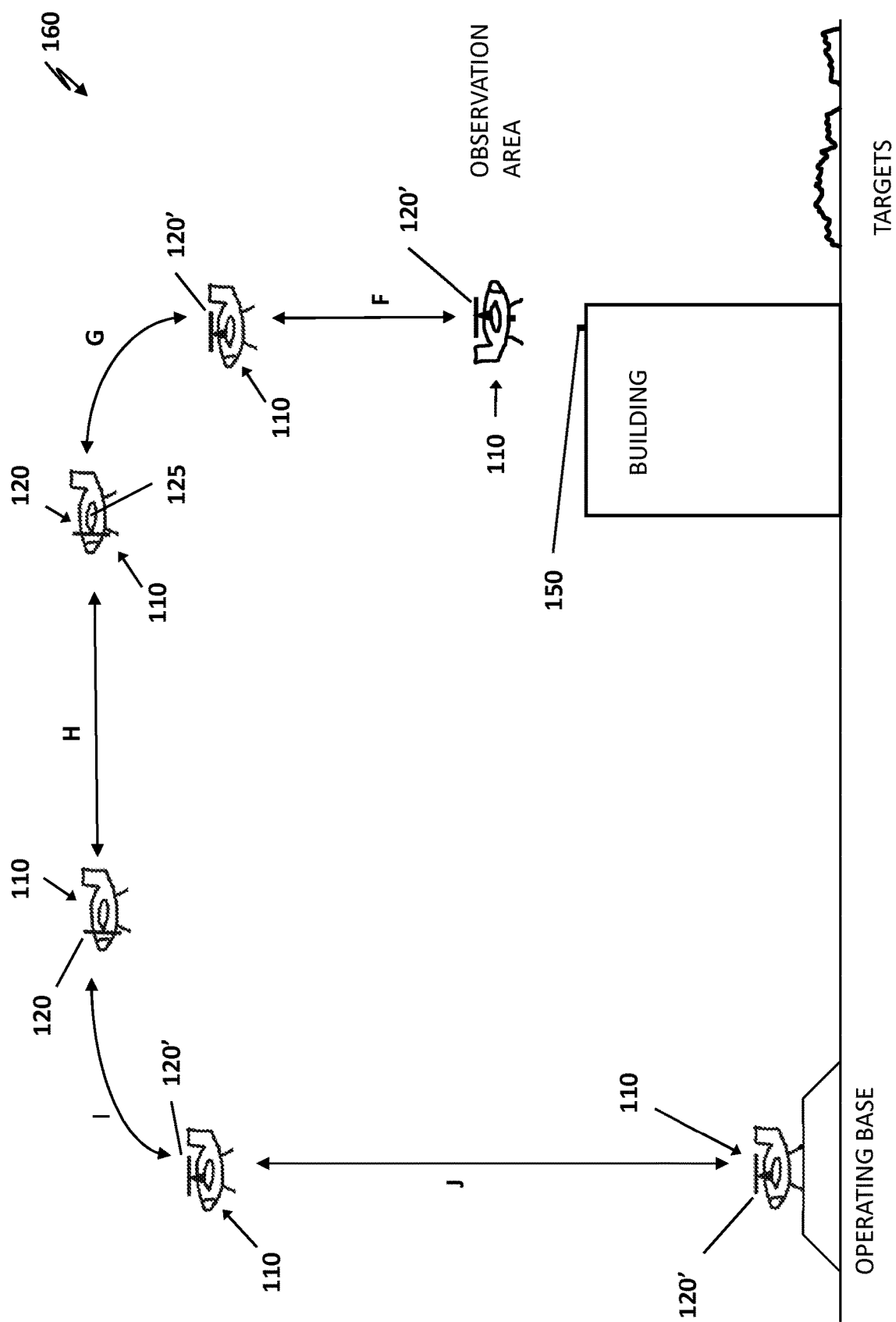
FIG. 1B depicts one embodiment of a flight-path of the UAV system for vertical ascent from an observation area and with a transition to horizontal flight.

FIGS. 1A-1C illustrate an exemplary embodiment of a UAV system that is capable of directing thrust to transition the UAV from an operating base to an observation location to observe an area, preferably using an anchor to fix the UAV to a surface for extended viewing, and then directing thrust to transition the UAV back to the operating base. More particularly, FIG. 1A is a flight-path diagram 100 of the UAV system that incorporates a block diagram illustrating preferred components of the UAV system. The UAV 110 has a fixed and preferably non-rotating wing 125 that is oriented to provide lift for the UAV 110 when the UAV is in forward flight but does not provide any substantial lift when the UAV 110 is in vertical flight. For example, the non-rotating wing 125 experiences primarily laminar flow over its lifting surfaces in forward flight, but does not experience laminar flow when the UAV 110 is in vertical flight. Propulsion motors, preferably electrically-powered propulsion motors 120 are located on both sides of the UAV 110 (figures only showing a motor on one side of the UAV 110) with the propulsion motors 120 selectively positionable relative to the wing 125 to change the direction of the thrust they generate, e.g., via propellers, from that for forward flight to that for vertical flight, as shown for propulsion motor 120'. As used herein, the term "motor" is intended to include components used to convert any form of energy into thrust for the UAV. In a preferred embodiment, the propulsion motors are electric motors and each includes a motor shaft and propeller. Or, the electric motor may be an assembly including a motor, motor shaft, and ducted fan; a motor, motor shaft, and tiltable propeller; or other apparatus wherein the motor may or may not be fixed relative to the wing, but at least portions of the motor are repositionable relative to the wing to selectively provide horizontal and vertical thrust for the UAV 110. In alternative embodiments, the two propulsion motors 120 may be replaced by a single propulsion motor or by a plurality of propulsion motors. Other embodiments of a propulsion motor may include a ducted fan (i.e., electric or liquid-fueled), a rocket (i.e., solid fuel or liquid), gas turbine, and a rotor motor.

The UAV 110 has an observation sensor 130 for generating observation data, with the observation sensor 130 in communication with a transmitter 190 for transmitting the observation data. A battery 170, or an array of batteries, preferably powers the propulsion motors, the observation sensor and the transmitter. A power distributor 180 controls the power distribution from the battery 170 to the propulsion motors 120, the observation sensor 130 and the transmitter 190. The observation sensor 130 is preferably an optical camera, but may be any of a variety of devices, including but not limited to an infrared camera, a microphone, a vibration sensor, a heat sensor, a radiation sensor, or the like. Embodiments of an observation sensor are shown and described in U.S. Provisional Patent Application No. 61/264,601 filed Nov. 25, 2009, entitled "Articulated Sensor Support Structure"; and International Application No. PCT/US10/58037 filed Nov. 24, 2010 entitled "Articulated Sensor Support Structure" and each are incorporated by reference in their entirety herein. Such an observation sensor may be articulated to support remote operator and/or autonomous landing of the UAV as shown and described in the aforementioned applications.

During operation, the UAV 110 takes off from an operating base and is capable of transitioning between vertical flight (i.e., ascent) and forward flight (i.e., horizontal). Path A of FIG. 1A illustrates the preferred vertical flight path of the UAV 110 up to a desired cruise altitude. Path B illustrates the UAV's 110 transition to forward flight, preferably in response to repositioning of propulsion motor 120 from the position shown by 120' to that shown by 120. While in forward flight shown by path C, the UAV 110 generates substantially all of its lift from the fixed or non-rotating wing 125 (deemed to include lift from the fuselage body in the case of a lifting-body fuselage) and the propulsion motors 120 are positioned to provide thrust at least generally in-line with the direction of forward flight. If such a path represents "slow flight", then the propulsion motors 120 may remain in a position that is in-line with a cord line (not shown) of the fixed wing 125 or may rotate to remain positioned to provide thrust at least generally in-line with the direction of forward flight. As the UAV 110 approaches the observation area, it is depicted as transitioning from forward flight back to vertical flight (i.e., descent) as shown by path D, either in response to the propulsion motors repositioning to position 120' or as supported by such repositioning. While in vertical flight (i.e., descent), the UAV 110 generates substantially all of its lift from the propulsion motors 120' positioned to do so, and not the wing 125. As shown by path E the UAV 110 then lands on the desired observation location, either through the use of an operator, an autonomous landing system, or some combination of both, to allow the sensor 130 to view potential targets in an area 140.

While at the observation location, the UAV 110 may in certain embodiments deploy an anchor, that may be an adhesive anchor 150 in order to secure itself to a landing surface (where "landing surface" may also mean an adjacent structure). The adhesive anchor 150 functions to keep the UAV 110 in position and prevent it from being moved or displaced due to actions such as winds and/or movement of the structure to which the UAV 110 may be attached. Other embodiments of an anchor 110 are further described in U.S. Provisional Patent Application No. 61/264,220 filed Nov. 24, 2009, entitled "Aircraft Grounding System"; and International Application Number PCT/US10/57984 filed Nov. 24, 2010, entitled "Aircraft Grounding System" and each are incorporated by reference into this disclosure.

FIG. 1B is a flight path diagram 160 of the UAV system that illustrates the return of the UAV to the operation base upon completion of its mission at the observation location. If the UAV 110 has used the adhesive anchor 150, then prior to departing the observation location the UAV 110 will separate from the adhesive anchor 150. The UAV 110 will then take off vertically, preferably along path F, with the propulsion motor providing vertical thrust in-line with the direction of vertical flight of the UAV 110 for UAV ascent. The transitional flight path is illustrated by path G, with the horizontal cruise path illustrated by flight path H. The transition from the vertical flight path F to horizontal cruise path H may be executed either in response to the propulsion motors repositioning to position 120 or as supported by such repositioning after separating from the anchor. Path I shows the transition flight path back to vertical flight path J (i.e., descent) to a landing that may be made in response to repositioning the propulsion motors from horizontal thrust to vertical thrust, or as supported by such repositioning.

FIG. 1C is a functional block diagram and top-level schematic illustrating one embodiment of a UAV system having components to reduce overall power requirements of the UAV during flight and/or while landed at the observation location. A power distributor 180 is configured to reduce or turn off power being provided to either the observation sensor 130 and the transmitter 190 and/or the propulsion motors 120' (if landed). Reducing power usage, turning off systems and/or limiting the time that a system or device is on (e.g., powered for flight) allows the UAV 110 to stay at the observation location over a longer period of time for a finite battery charge capacity. That is, the UAV 110, while landed, periodically and/or intermittently may use the power distributor to turn on or increase power to the observation sensor 130 and/or the transmitter 190 to generate observation data and/or to transmit the observation data via the transmitter to the operating base and/or to any other external receiver over a period of time. This allows the operator of the UAV 110 to observe an area over a period of time that may be shortened if the vehicle was also powered for flight and/or did not export the wing lift during horizontal flight.

Figure 2A:
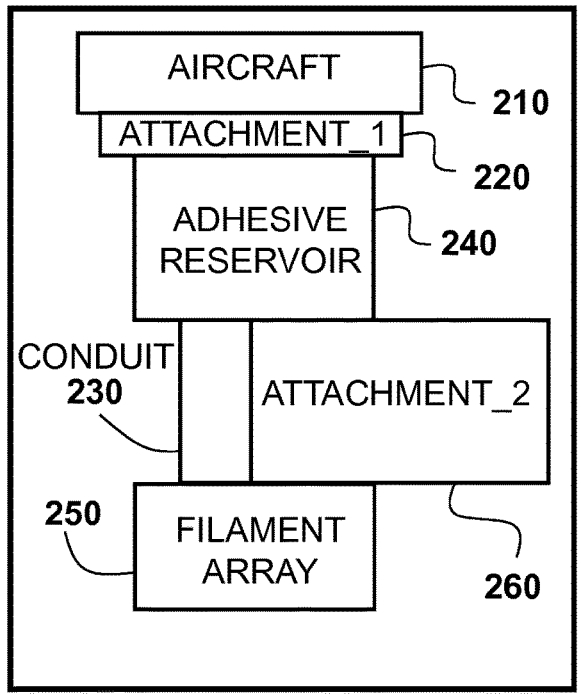
FIGS. 2A and 2B depict the UAV system of FIGS. 1A-1C having, in one embodiment, an adhesive anchor operable to secure the UAV system to a landing surface.
Figure 2B:
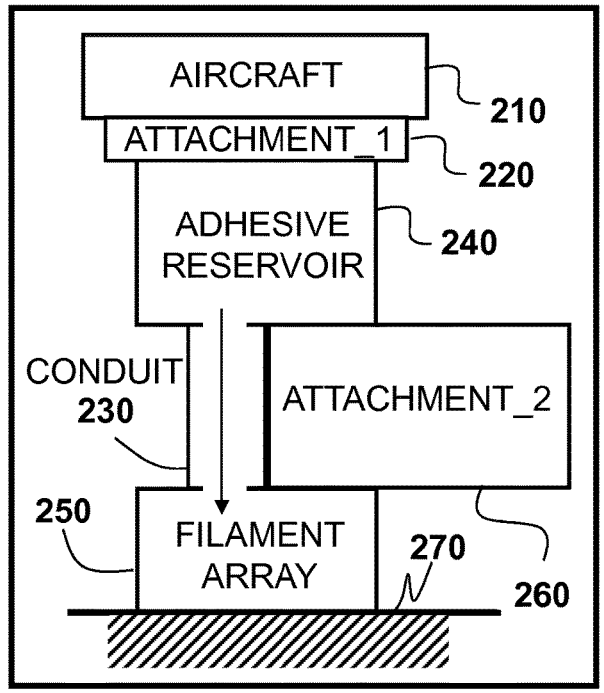
Figure 2C:
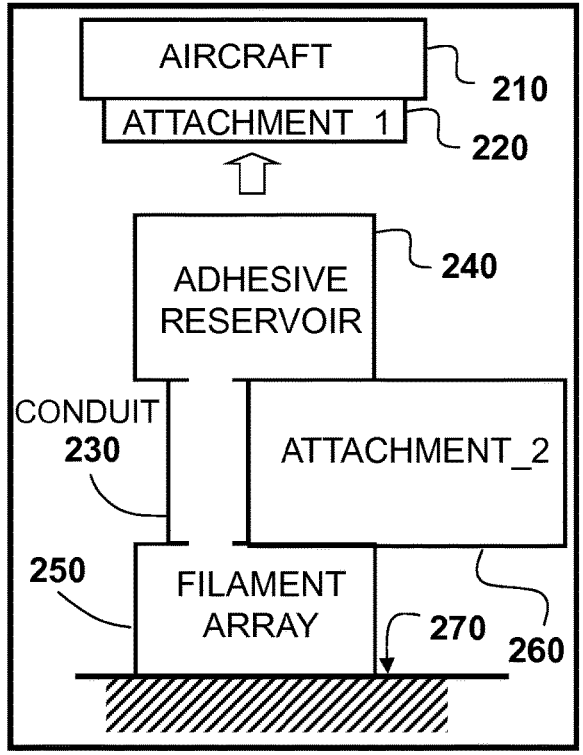
FIG. 2C depicts the UAV system and adhesive anchor of FIGS. 2A and 2B and illustrating one embodiment for detachment of the UAV system from the landing surface.
Figure 2D:
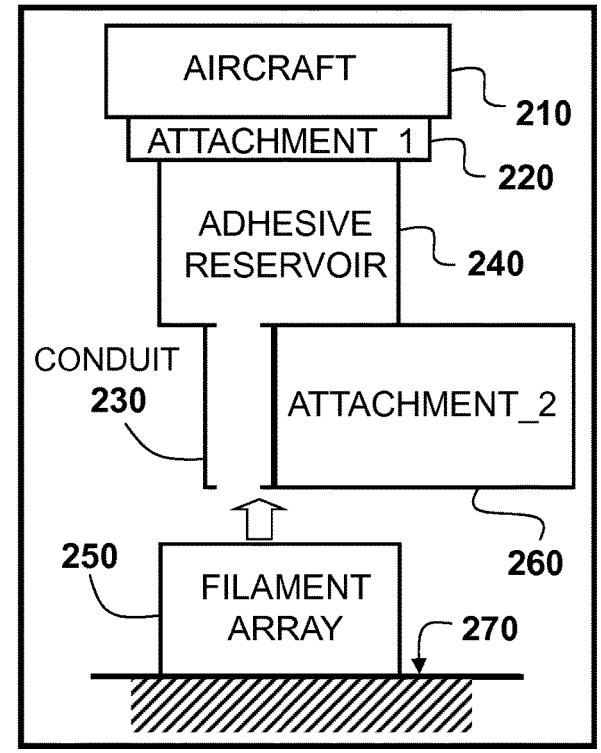
FIG. 2D depicts the UAV system and adhesive anchor of FIGS. 2A and 2B, further illustrating another embodiment for detachment of the UAV system from the landing surface.

FIG. 2A is a block diagram of an exemplary UAV anchor first illustrated in FIG. 1A that uses, in one embodiment, an adhesive material delivered to a filament array that is deployed from the UAV and positioned on a UAV landing surface to secure the UAV to the landing surface with the adhesive. The UAV 210 is depicted as attached to a liquid adhesive reservoir 240 by an attachment_1 220. A channel or conduit 230 may be provided between the liquid adhesive reservoir 240 and a brush assembly 250 such as, for example, a filament array, bristle array, or an array of bundles, strips of fabric, cotton balls, or clumps of cloth. The liquid adhesive reservoir 240 may be attached by attachment_2 260 to the filament array 250. Before or after the filament array 250 contacts the landing surface 270, the liquid adhesive may flow from the liquid adhesive reservoir 240 to the filament array 250 via the conduit 230 as shown in FIG. 2B. The filament elements of the filament array 250 having liquid adhesive provide the landing surface 270 with bonding areas. Once elements of the filament array 250 have bonded to the landing surface 270, the UAV may be adhesively anchored to the landing surface 270. To free itself from the anchor provided by the bonded elements of the filament array 250, the UAV may be detached via release of attachment_1 220 as shown in FIG. 2C or release of attachment_2 260 as shown in FIG. 2D, or combinations thereof.

Figure 3:
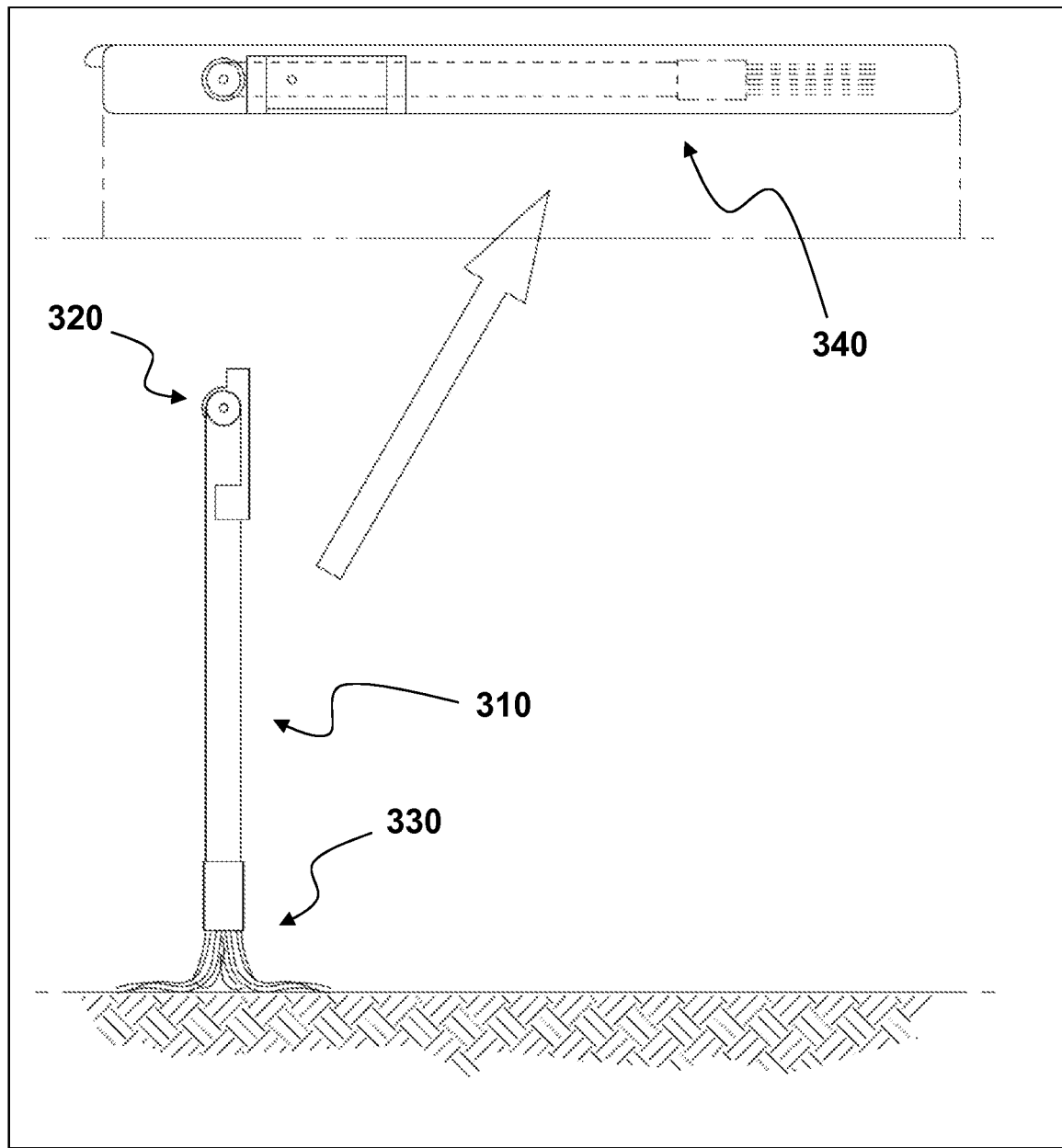
FIG. 3 illustrates an assembly embodiment of an adhesive anchor.

FIG. 3 shows an assembly comprising a cylinder 310 for containing a liquid adhesive reservoir where the assembly further comprises an attachment joint 320 at a proximal end of the cylinder and an array of filaments 330, bristles, or fabric strips, at the distal end of the cylinder. A channel or conduit may be provided within the cylinder 310 between the liquid adhesive reservoir and the filament array 330 for conducting the flow of the liquid adhesive to the filament array, where the filament array may be in contact with a surface for anchoring. FIG. 3 also shows the assembly may be stowed, prior to deployment, in a dispensing case 340.

Figures 4A, 4B:
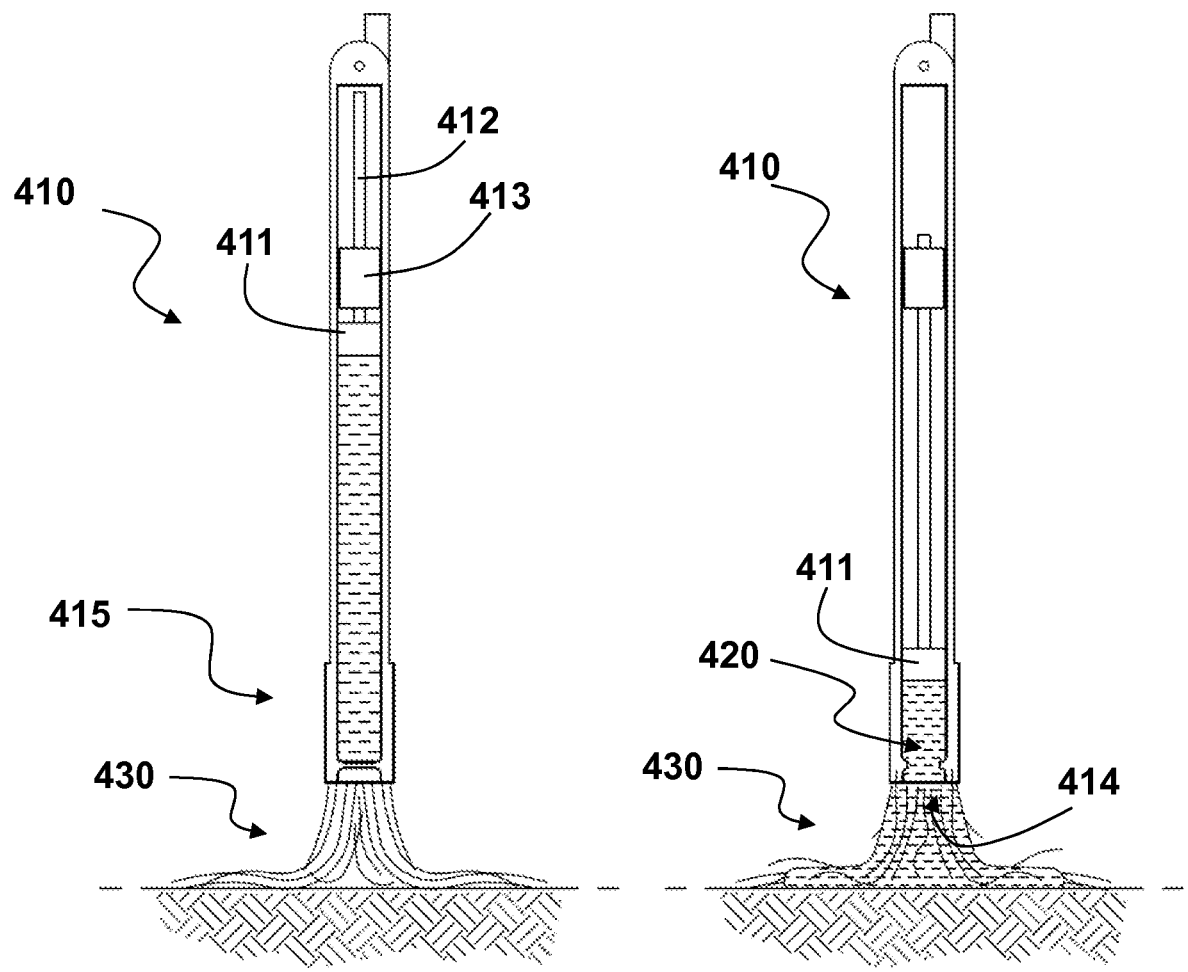
FIGS. 4A, 4B, and 4C illustrate another assembly embodiment of an adhesive anchor.
Figure 4C:
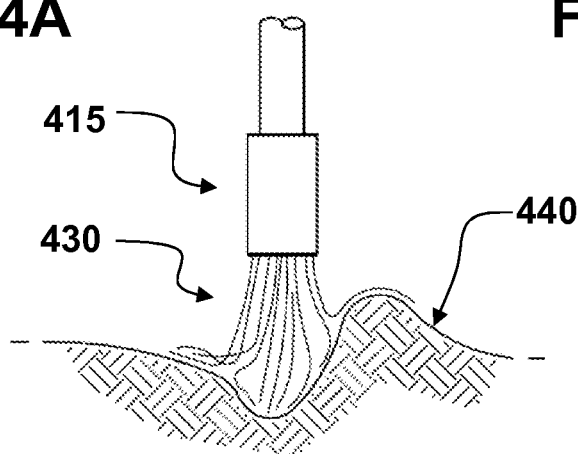

FIG. 4A shows in cross-section the cylinder 410 having a plunger 411 with a shaft 412 piercing a stopper 413. FIG. 4B shows the liquid adhesive 420 may be expressed from the cylinder 410 as the plunger 411 moves toward the opening 414. FIG. 4C shows the brush 430 of the distal portion 415 of the cylinder 410 may disperse its fibers or filaments in such a fashion as to provide contact with uneven surfaces 440. FIG. 5A shows in cross-section the cylinder 510 having a pointed spring-loaded shaft 511 held in place by a pin 512. FIG. 5B shows that with the pin removed, the pointed spear 511 may pierce a seal 513 of the liquid adhesive reservoir, allowing the liquid glue to flow to the bundle of bristles or filaments 430.

Figures 6, 7:
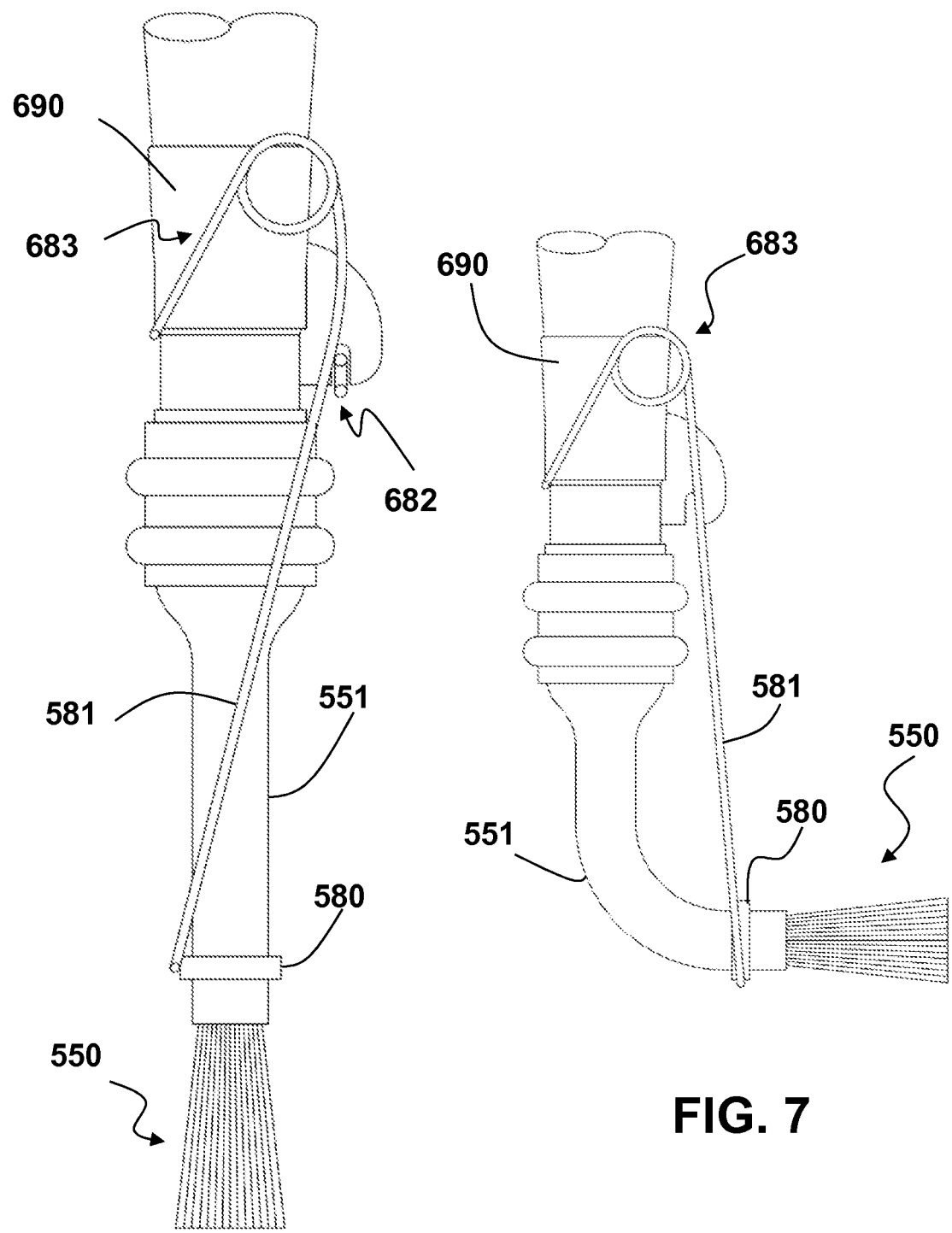
FIGS. 6-8 illustrate another assembly embodiment of an adhesive anchor.
Figure 8:
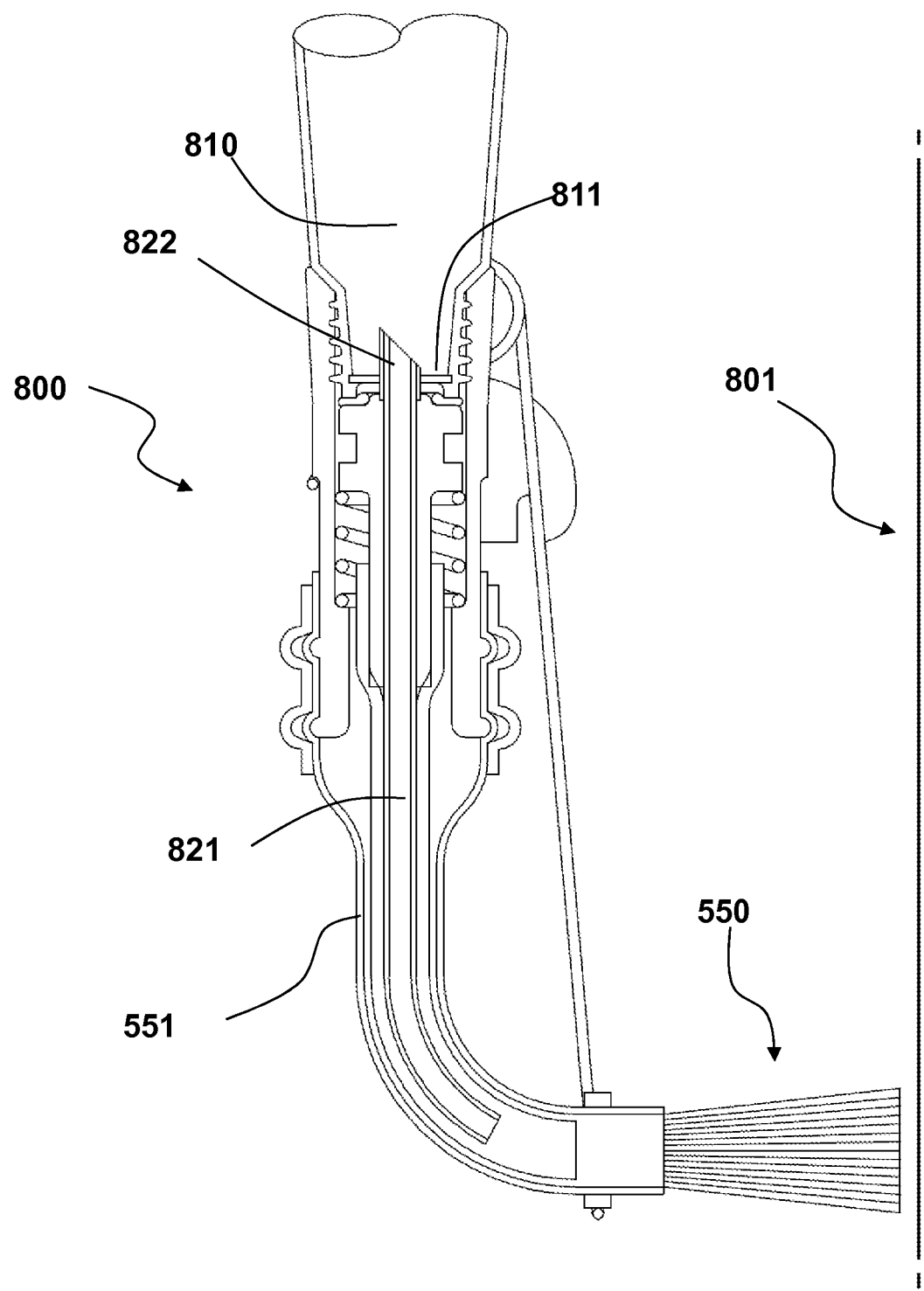

FIG. 6 shows, in another embodiment, a side view of the spring wire 581 in contact with the collar 580, where the collar is disposed about the brush filament conduit 551. Another portion of the spring 683 is disposed on a mounting sleeve or mounting case 690 as seen in FIG. 6. The spring wire 581 is compressed and held in place by a pin 682. FIG. 7 shows in a side view the spring wire 581 is in a restored, i.e., uncompressed, position and the brush filament conduit 551 is deflected thereby reorienting the brush filament bundle 550. FIG. 8 illustrates in a cross-sectional view the deflection of the brush filament conduit 551 which places pressure in the distal end portion of the flexible lineal conduit 821, a pressure that works to drive the piercing aperture 822 into the liquid adhesive reservoir 810 via a pierced seal 811. Accordingly, the assembly 800 is shown in a deployed state having a brush filament bundle 550 receiving liquid from the reservoir 810 and positioned for application to an exemplary surface 801.

Figure 9A:
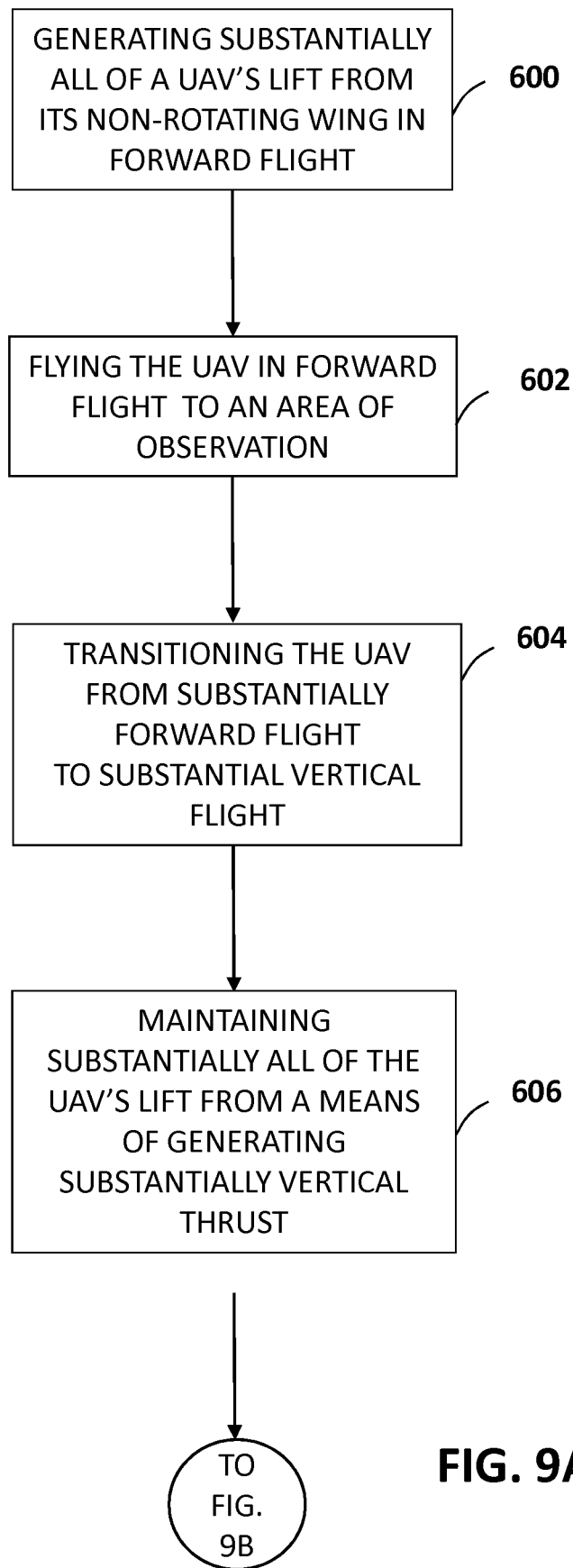
FIGS. 9A and 9B depict a flow diagram illustrating one embodiment of a method for deploying a UAV system to an observation area and generating and transmitting observation data.
Figure 9B:
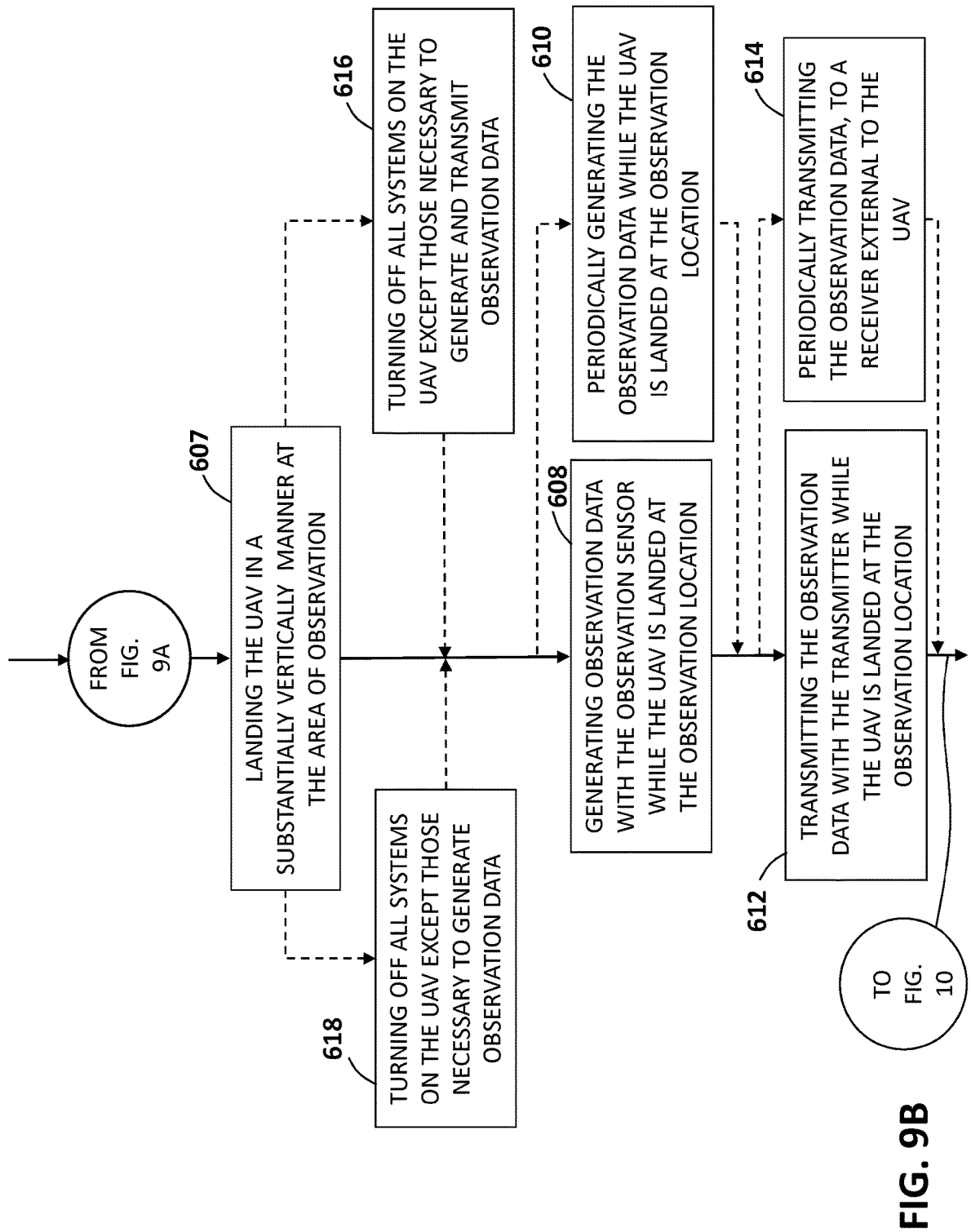

FIGS. 9A and 9B depict a flowchart illustrating an exemplary embodiment of a method for deploying an unmanned aerial vehicle (UAV) having an observation sensor for generating observation data, and a transmitter for transmitting the observation data, wherein the UAV is capable of forward and vertical flight. In this embodiment, the UAV generates substantially all of its lift from its non-rotating wing during forward flight (block 600) to an area of observation (block 602) and then transitions from substantially forward flight to substantially vertical flight (block 604. During vertical flight (in this case, descent), the UAV maintains substantially all of its lift from a means of generating substantially vertical thrust as disclosed herein, preferably from a plurality of electric motors (block 607). The UAV lands in a substantially vertically manner at an observation location (block 606) and generates observation data with the observation sensor while the UAV is landed at the observation location (block 608. In an alternative embodiment, the observation sensor is capable of periodically generating the observation data (block 610), rather than continuously generating the observation data, in order to conserve system power. The UAV may transmit the observation data via the transmitter while the UAV is landed, e.g., adhered to the observation location (block 612). Exemplary embodiments, may have the transmitter capable of periodically transmitting the observation data to a receiver external to the UAV (block 614), rather than continuously transmitting, and the discontinuous transmissions may conserve system power. In some exemplary embodiments, the UAV may be capable of turning off all systems on the UAV except those necessary to generate and transmit observation data (block 616). Or, the UAV may be capable of selectively turning off even those systems necessary to transmit the observation data (block 618) while retaining autonomous power-up capability, e.g., via a timer and/or light sensor.

Figure 10:
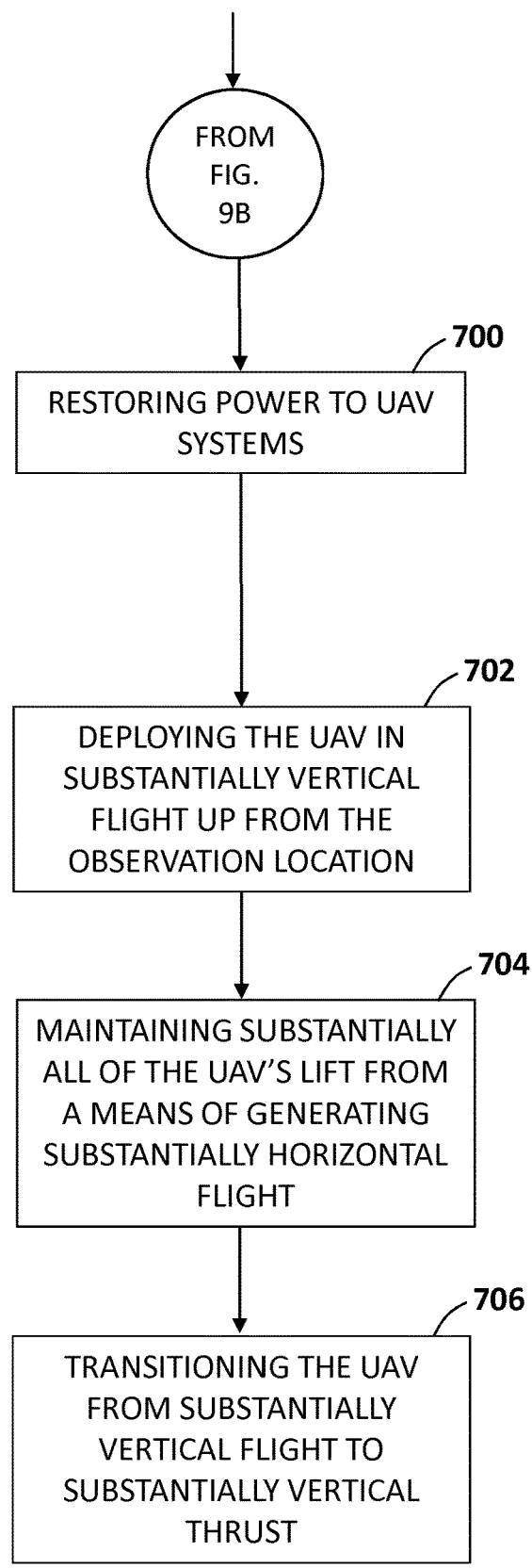
FIG. 10 is a flowchart illustrating an embodiment for deploying a UAV away from the observation area.

FIG. 10 is a flowchart illustrating an exemplary method embodiment of deploying a UAV away from the area of observation. Power is restored to all systems on the UAV necessary to deploy the UAV from the observation location (block 700), and the UAV is deployed in a substantially vertical manner up from the observation location (block 702). As in descent, the UAV maintains substantially all of its lift from a means of generating substantially vertical thrust (block 704), preferably from a plurality of electric motors. The UAV transitions from substantially vertical flight to substantially horizontal flight (block 706) from the area of observation.

Figure 11A:
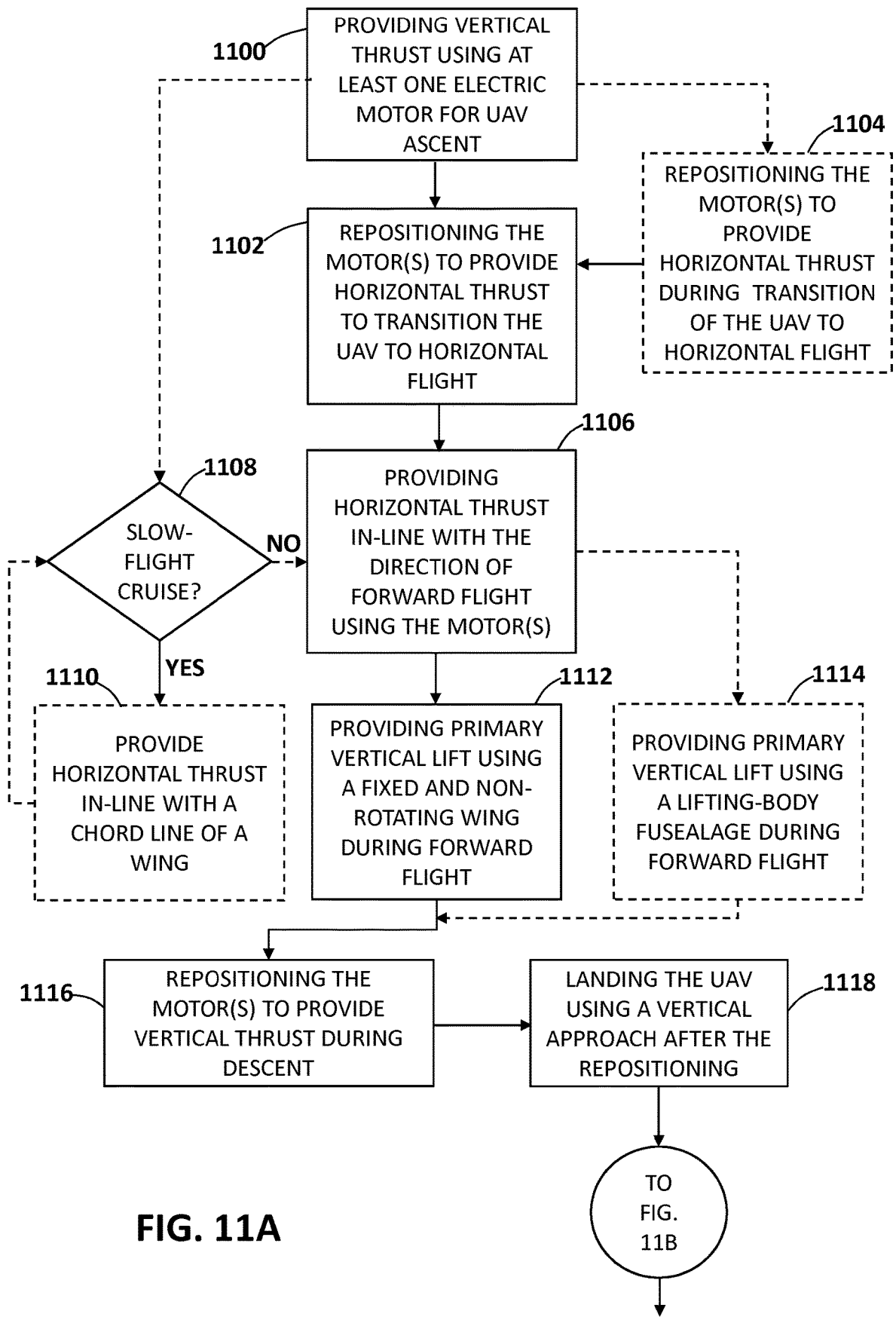
FIGS. 11A and 11B depict a flowchart illustrating an embodiment of a UAV system method for ascending using an electric motor, repositioning the motor to transition to horizontal flight and vertical descent, and generating observation data for transmission to an external receiver.
Figure 11B:
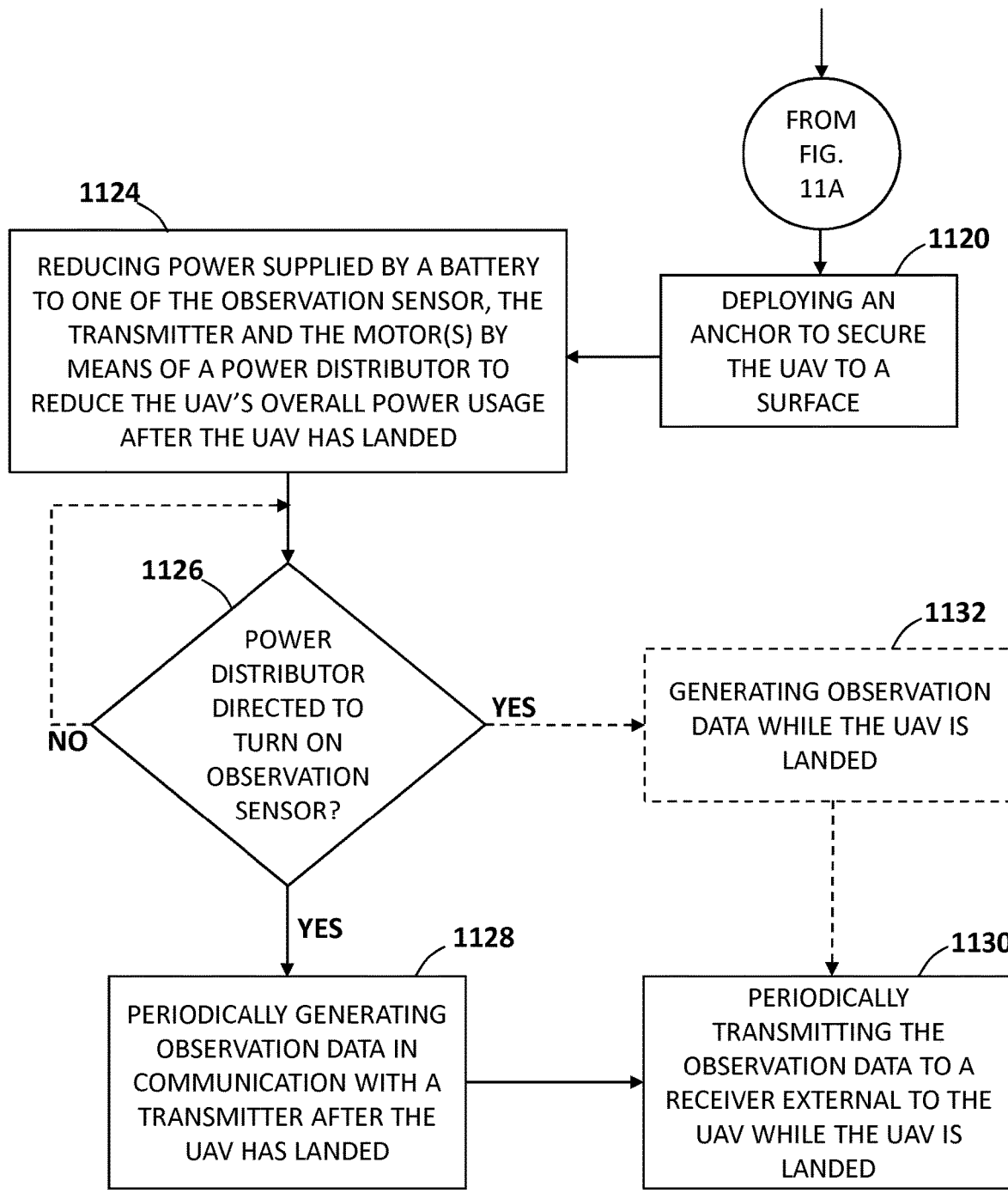

FIGS. 11A and 11B depict in a flowchart illustrating an exemplary embodiment of taking off in substantially vertical flight from an operating base an unmanned aerial vehicle (UAV) having a non-rotating wing, using propulsion motors positionable to change the direction of the thrust they generate wherein the UAV is capable of transitioning between forward and vertical flight. While in forward flight the UAV generates substantially all of its lift from the non-rotating wing and the propulsion motors are positioned to provide thrust at least generally in-line with the direction of forward flight, and while in vertical flight the UAV generates substantially all of its lift by the propulsion motors positioned to do so. Thereafter, the UAV cruises in substantially forward flight to an area of observation and then transitions from substantially forward flight to substantially vertical flight in order to land in a substantially vertical flight path at an observation location in the area of observation.

More particularly, vertical thrust is provided using at least one electric motor (preferably two) for UAV ascent (block 1100). The electric motors are repositioned to provide horizontal thrust to transition the UAV from vertical to horizontal flight (block 1102). In an alternative embodiment, the electric motors (or at least one of the motors) do not transition the UAV to horizontal flight, but rather are repositioned merely to assist the transition to horizontal flight (block 1104). Horizontal thrust is then provided in-line with the direction of forward flight using the electric motors (block 1106). Or, if the UAV is in slow-flight conditions (block 1108), and so the fixed and non-rotatable wing is experiencing high angles of attack, the horizontal thrust may be provided in-line with a chord line of the wing to provide horizontal thrust (block 1110). During forward flight, primary vertical lift is provided using the fixed and non-rotating wing (block 1112). Or, if the UAV is provided with a lifting-body fuselage, primary vertical lift may be provided by the lifting-body itself, or with some combination of the wing and lifting body, rather than by the electric motors (block 1114). After the pre-determined horizontal flight path has been accomplished, the electric motors are repositioned to provide vertical thrust during descent (block 1116) and the UAV is landed using a vertical approach after the motor repositioning (block 1118.

An anchor may be deployed to secure the UAV to a landing surface (block 1120) and a power distributor preferably reduces power provided by the battery on board the UAV to at least one of the observation sensor, the transmitter and the electric motors to reduce the overall power usage of the UAV after the UAV has landed (block 1124). In an exemplary embodiment, if the power distributor is directed (or directs) that power is to be periodically switched on to the observation sensor (block 1126), the observation sensor will periodically generate observation data and communicate it to the transmitter (block 1128) for periodic transmission to a receiver external to the UAV (block 1130). Otherwise, the observation data may be generated continuously (block 1126) and communicated to either a transmitter or memory storage device for transmission to an external receiver (block 828). In an alternative embodiment, observation data is generated continuously (block 832) and provided to the transmitter for transmission to the external receiver (block 1130).

Figure 12:
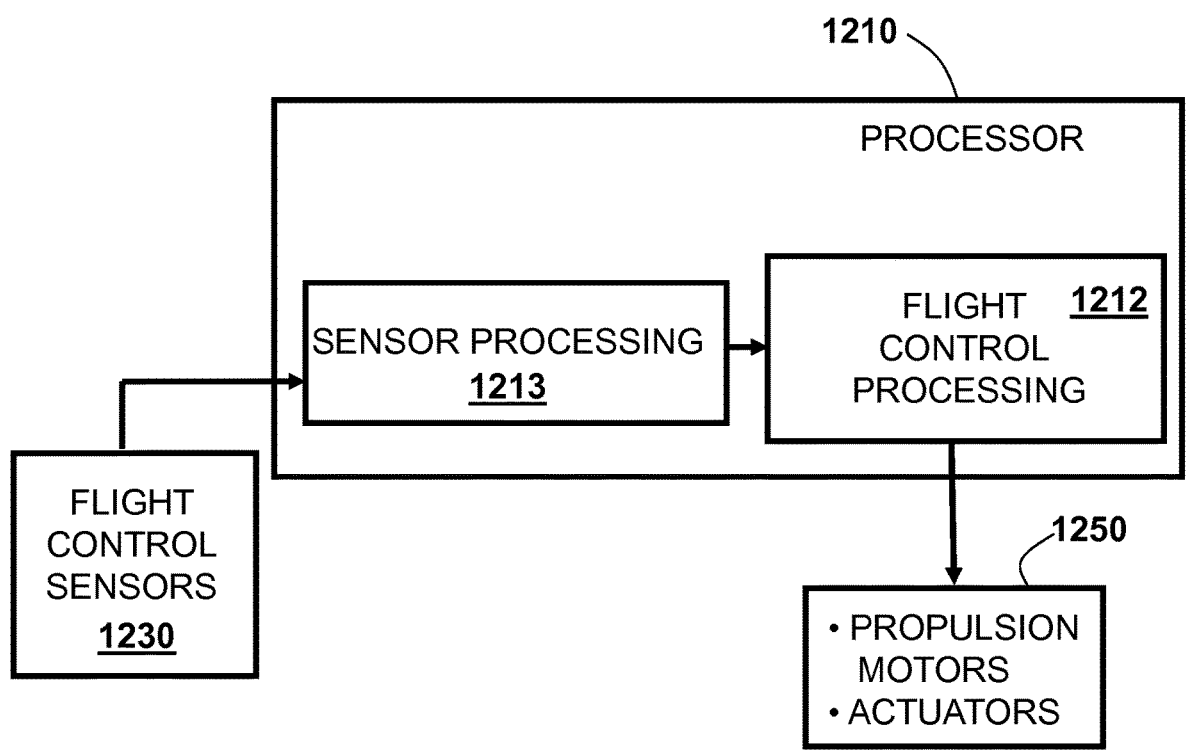
FIG. 12 is a top level functional block diagram a processing device that may be used to selectively control rotation of the propulsion motors.

FIG. 12 is a top level functional block diagram of an embodiment where a processing device or processor 1210 may include one or more central processing units (CPUs) and addressable memory to selectively control rotation of the propulsion motors. The processor 1210 may include functional modules of executable instructions and/or firmware modules to affect such rotation. The processor 1210 may also be configured to execute instructions to perform flight control, and/or sensor processing/filtering. The processor 1210 may be included in the power distributor 180, as shown in FIG. 1C, or as part of a separate module in communication with the power distributor 180. A flight control processing module 1212 for an air vehicle may receive sensed vehicle dynamics, sensed and/or estimated vehicle positions and/or velocities, and heading and/or attitude commands through the sensor processing module 1213. The flight control processing module 1212 may output commands to the propulsion motors 1250, e.g., propeller motors, and actuators, e.g., control surface actuators. The sensor processing module 1213 may also receive output from vehicle dynamic sensors such as accelerometers and/or gyroscopes referenced by flight control sensors 1230. The sensor processing module 1213 may filter or otherwise condition the input from the flight control sensors 1230 before providing the filtered and/or processed information to the flight control processing module 1212. Embodiments of the processor 1210 may include navigation processing that may be executed by sensor processing module 1213, flight control processing module 1212, or distributed between the two processing modules of the processor 1210.

Depending on the function of the processor 1210, other modules, including functions and capabilities, may be added or removed. Furthermore, the modules 1212, 1213 in the exemplary processor 1210 described herein may be further subdivided and combined with other functions to accomplish the functions and processes described herein. The various modules may also be implemented in hardware, or a combination of hardware and software, i.e., firmware. For an air vehicle embodiment, the external components may include a lifting surface extension, a tail boom, a motor, a battery module, observation sensor, power distributor, and a payload module.

Figure 13:
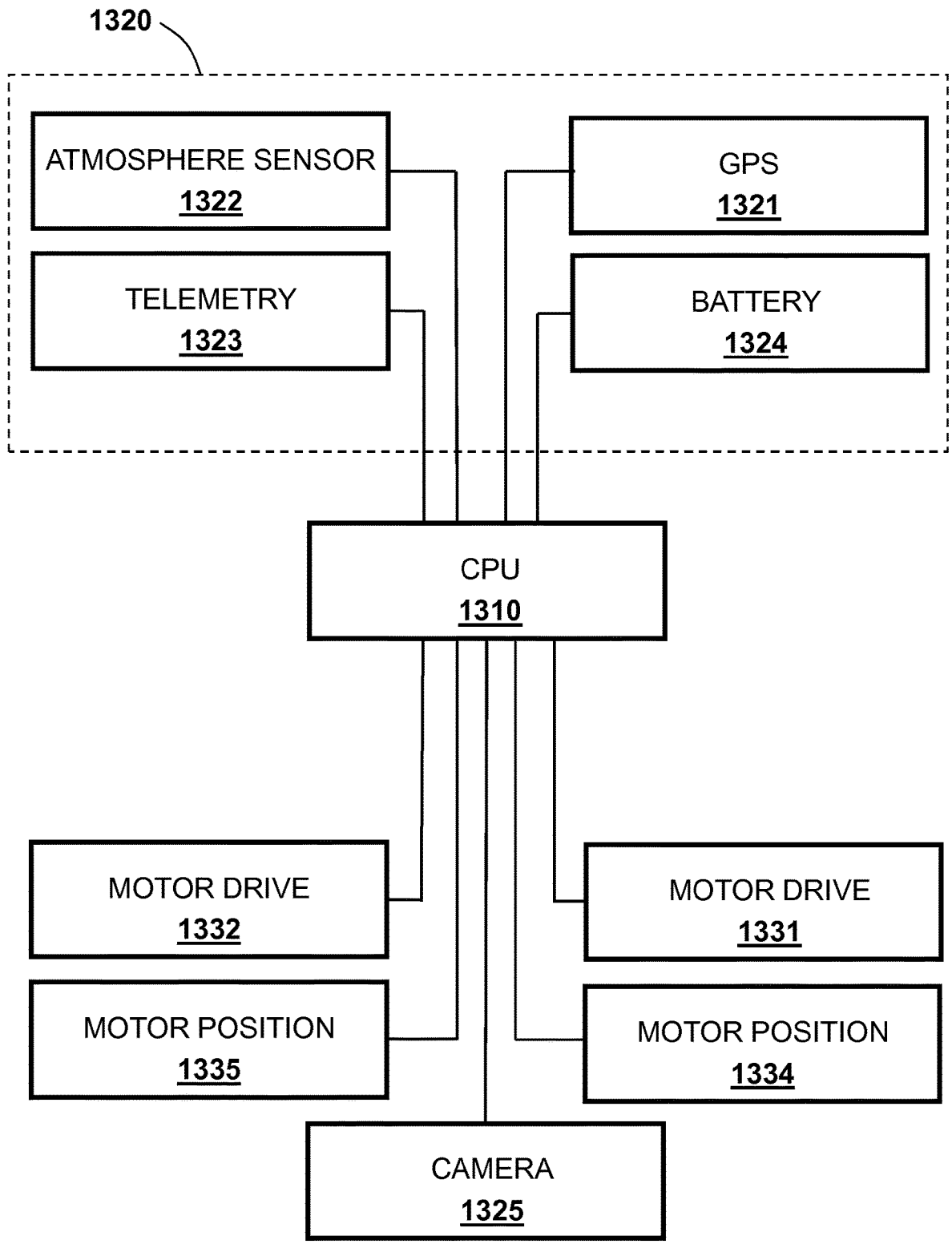
FIG. 13 is a top level functional block diagram of one embodiment of a control system to selectively control rotation of the propulsion motors.

FIG. 13 is a top level functional block diagram of an embodiment for an air vehicle where the system includes a CPU 1310; flight control components 1320 including a Global Positioning System (GPS) sensor and processing 1321; an atmospheric pressure sensor 1322; a power supply including a battery 132; and a telemetry 1323 that may include an uplink receiver and processor that may separately, or in combination, selectively control rotation of the propulsion motors. The flight control components 1320 may also include an inertial measurement unit and/or accelerometers and/or gyroscopic sensors (not shown). The system may further include an observation sensor such as camera 1325. The system may further include a forward port/left motor drive 1331 to selectively rotate a propulsion motor relative to a wing, a forward starboard/right motor drive 1332 to selectively rotate a second propulsion motor relative to a second wing, a forward port/left motor position module 1334 to control the forward port/left motor drive 1331, a forward starboard/right motor position module 1335 to control the forward starboard/right motor drive 1332. The system may alternatively include a single motor drive, and corresponding motor tilt. The communication channels may be wired and/or wireless, e.g., radio frequency and/or infrared. The wired communication channels may include metal wire channels having protocols including IEEE 1553, Ethernet, and the universal serial bus (USB), and fiber optic channels.

Figure 14A:
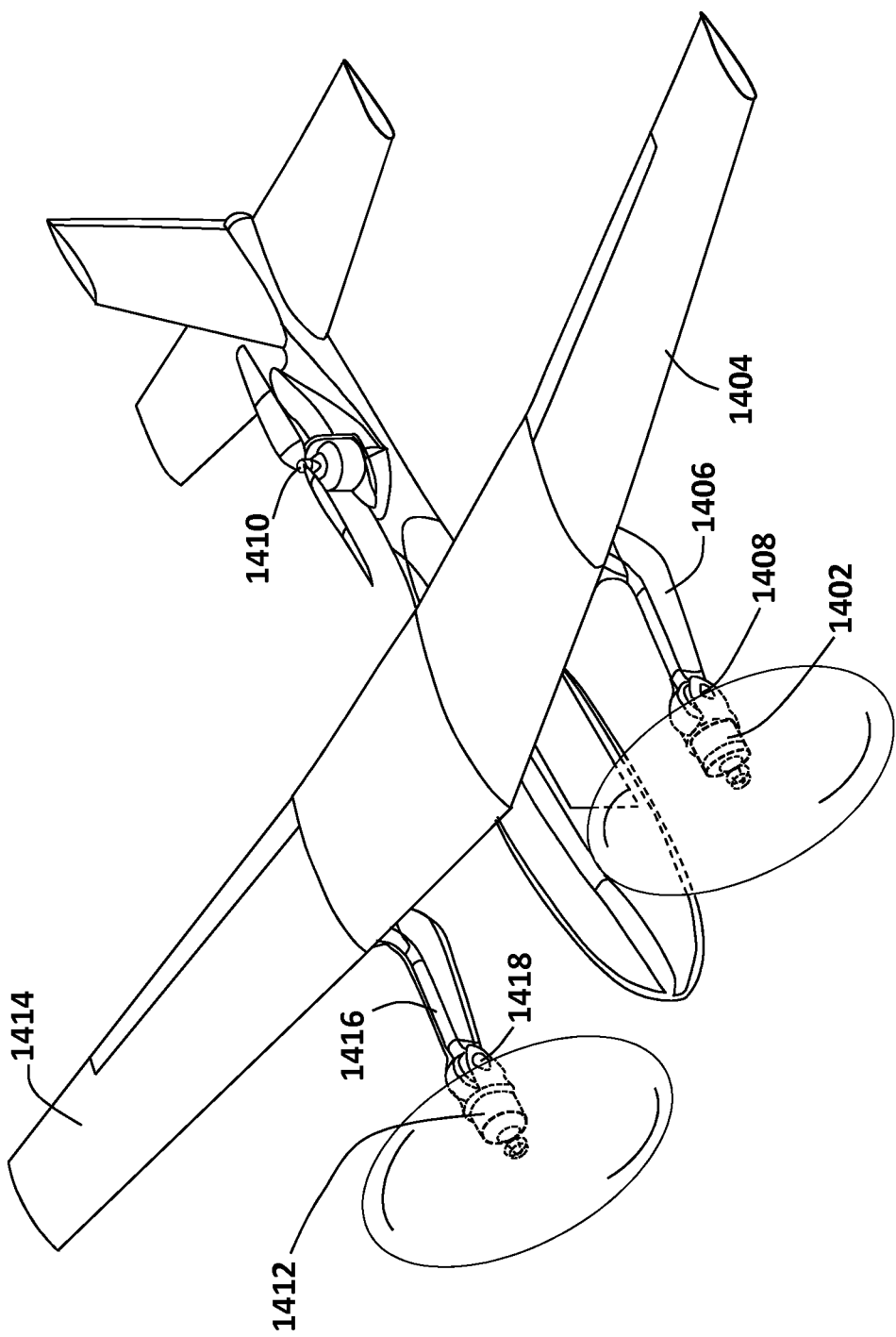
FIGS. 14A and 14B are perspective views of one embodiment of a UAV that has two selectively rotatable propulsion motors, one on each side of the UAV, and one fixed motor on a tail boom.
Figure 14:
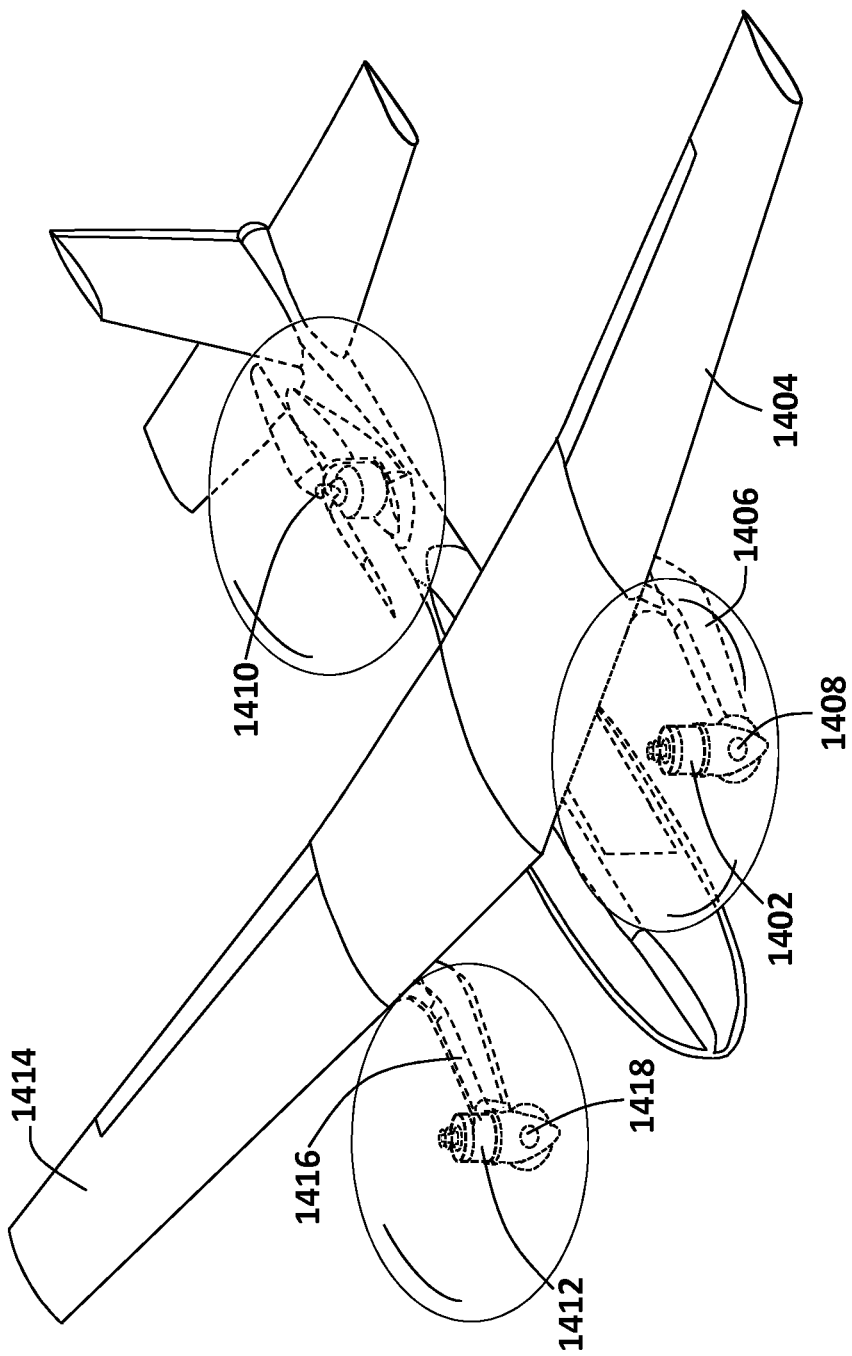

FIGS. 14A and 15B are a perspective views illustrating one embodiment of a UAV having two selectively rotatable motors to enable vertical ascent, horizontal cruise and vertical descent. A left propulsion motor 1402 is coupled to a left wing 1404 through a left motor boom 1406. The left motor 1402 is selectively rotatable about a left motor pivot point 1408 to enable both forward flight (as shown), and vertical flight through rotation of the left propulsion motor 1402 to a vertical position about the left motor pivot point 1408. The pivoting may be accomplished by the forward port/left motor drive 1331 that is coupled to the left motor 1402, with the forward port/left motor drive 1331 positioned either in the left motor boom 1406 or in the left propulsion motor 1402, itself. In one embodiment, an aft fixed propulsion motor 1410 is powered and provides vertical thrust during vertical ascent and vertical landing and is turned off for forward flight. Other embodiments of an aft fixed propulsion motor and suitable functional block diagrams for control are shown and described in are shown and described in U.S. provisional patent Application No. 61/264,587 filed Nov. 25, 2009, entitled "Automatic Configuration Control of a Device"; and International Application No. PCT/US2010/058020 filed Nov. 24, 2010, entitled "Automatic Configuration Control of a Device" and each is incorporated by reference in their entirety herein.

Similarly, a right propulsion motor 1412 is coupled to a right wing 1414 through a right motor boom 1416. The left motor 1412 is selectively rotatable about a right motor pivot point 1418 to enable both forward flight (as shown), and vertical flight through rotation of the right propulsion motor drive 1412 to a vertical position about the right motor pivot point 1418. The pivoting may be accomplished by the forward starboard/right motor drive 1332 that is coupled to the right motor 1412, with the forward starboard/right motor drive 1332 positioned either in the right motor boom 1466 or in the right propulsion motor 1412, itself.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. For example, use of the phrase "substantially all" is used as understood by one of ordinary skill in the art and so may approach a value of approximately 80%-100% of that amount compared. The phrase "substantially forward", "substantially horizontal" and "substantially vertical" are used as understood by one of ordinary skill in the art, and so may approximate a value of 0-20% "forward", "horizontal" and "vertical", with respect to the local horizontal respectively. Similarly, the phrase "in-line with" is used as understood by one of ordinary skill in the art and so may approach approximately 0-30 degrees from the base angle measured.

It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method, comprising:
    transitioning an unmanned aerial vehicle (UAV) having a processor, from an operating base to an observation location;
    securing the UAV to a surface at the observation location via an anchor;
    switching off all systems on the UAV while secured to the surface except those necessary to generate and transmit observation data via a power distributor, wherein the power distributor is in communication with the processor of the UAV, and wherein the UAV retains autonomous power-up capability;
    switching off power periodically from a battery of the UAV to an observation sensor via the power distributor to extend a stay at the observation location with a finite charge capacity of the battery;
    switching on power periodically from the battery of the UAV to the observation sensor via the power distributor;
    generating observation data from the observation location of one or more potential targets using an observation sensor of the UAV when power is periodically switched on from the battery of the UAV to the observation sensor; and
    communicating the generated observation data of the one or more potential targets to a transmitter for periodic transmission to a receiver external to the UAV.

2. The method of claim 1, wherein the power is periodically switched on at regular intervals.

3. The method of claim 1, further comprising:
    switching off power periodically from the battery of the UAV to the transmitter via the power distributor to extend the stay at the observation location with the finite charge capacity of the battery; and
    switching on power periodically from the battery of the UAV to the transmitter via the power distributor.

4. The method of claim 1, wherein the autonomous power-up capability is retained via a timer.

5. The method of claim 1, wherein the autonomous power-up capability is retained via a light sensor.

6. The method of claim 1, further comprising:
detaching the UAV from the surface at the observation location; and
transitioning the UAV from the observation location to the operating base.

7. The method of claim 1, wherein said observation sensor is a sensor selected from the group consisting of an optical camera, an infrared camera, a microphone, a vibration sensor, a heat sensor and a radiation sensor.

8. The method of claim 1, further comprising:
restoring power to all systems on the UAV necessary to deploy the UAV from the surface.

9. The method of claim 1, further comprising:
reducing power to at least one of said observation sensor and said transmitter through said power distributor to reduce the UAV's overall power usage during UAV horizontal flight.

10. An unmanned aerial vehicle (UAV) apparatus comprising:
a fixed and non-rotating wing to provide primary lift for the UAV while in horizontal flight;
at least one electric motor providing primary lift for the UAV during vertical flight;
an observation sensor;
a transmitter in communication with the observation sensor;
a battery configured to provide power to the UAV;
a power distributor configured to prolong a usage of the battery;
a processor having addressable memory, wherein the processor is in communication with the power distributor, the processor configured to:
switch off all systems on the UAV when the UAV is landed at an observation location except those necessary to generate and transmit observation data via the power distributor, wherein the UAV retains autonomous power-up capability;
switch off power periodically from the battery of the UAV to the observation sensor via the power distributor to extend a stay at the observation location with a finite charge capacity of the battery;
switch on power periodically from the battery of the UAV to the observation sensor via the power distributor;
generate observation data from the observation location of one or more potential targets using an observation sensor of the UAV when power is periodically switched on from the battery of the UAV to the observation sensor;
transmit said generated observation data of the one or more potential targets to a transmitter for periodic transmission to a receiver external to the UAV.

11. The apparatus of claim 10, wherein said observation sensor is selected from the group consisting of a microphone, a vibration sensor, a heat sensor, and a radiation sensor.

12. The apparatus of claim 10, wherein said observation sensor is selected from the group consisting of a camera, an optical camera, and an infrared camera.

13. The apparatus of claim 10, wherein said processor is further configured to:
reduce power, by the power distributor, to at least one of: said observation sensor and said transmitter during UAV horizontal flight.

14. The apparatus of claim 10, wherein said processor is further configured to:
restore power, by the power distributor, to all systems on said UAV necessary to deploy said UAV from said surface.

15. An unmanned aerial vehicle (UAV), comprising:
a processor having addressable memory, the processor configured to:
transition an unmanned aerial vehicle (UAV) from an operating base to an observation location;
switch off all systems on the UAV at the observation location except those necessary to generate and transmit observation data via a power distributor, wherein the power distributor is in communication with the processor of the UAV, and wherein the UAV retains autonomous power-up capability;
switch off power periodically from a battery of the UAV to an observation sensor via the power distributor to extend a stay at the observation location with a finite charge capacity of the battery;
switch on power periodically from the battery of the UAV to the observation sensor via the power distributor;
generate observation data from the observation location of one or more potential targets using an observation sensor of the UAV when power is periodically switched on from the battery of the UAV to the observation sensor;
transmit said generated observation data of the one or more potential targets to a transmitter for periodic transmission to a receiver external to the UAV.

* * * * *